United States Patent Office

Re. 25,622
Reissued July 28, 1964

25,622

STABLE SILANE TRIOL COMPOSITION AND METHOD OF TREATING GLASS THEREWITH

Clinton W. MacMullen, Hamden, Conn., and Alfred Marzocchi, Pawtucket, R.I., assignors to Cowles Chemical Company, Cleveland, Ohio, a corporation of Ohio No Drawing. Original No. 2,723,211, dated Nov. 8, 1955, Ser. No. 348,552, Apr. 13, 1953. Application for reissue June 30, 1958, Ser. No. 755,818
8 Claims. (Cl. 117—126)

Matter enclosed in heavy brackets [ ] appears in the original patent but forms no part of this reissue specification; matter printed in italics indicates the additions made by reissue.

This invention is concerned generally with the application of organosilicon coatings to various materials to render them water-repellent and is particularly useful in connection with the application of organosilicon coatings to glass fibres either before or after weaving to confer on the fibers and cloth woven therefrom certain desirable properties such as water repellency, resin adhesion and abrasion resistance. For convenience the present method will be described herein largely in terms of its application to glass fibres and glass cloth, although as the description proceeds it will be apparent that the method is applicable to the surface treatment of other materials as well. The present application is a continuation-in-part of our prior application Serial No. 119,569, filed October 4, 1949, now abandoned.

In recent years there has been an expanding use of glass fibres and cloth for a wide variety of purposes. For example, it has been found that glass fibres provide an excellent reinforcing medium for plastics such as phenolic, polyester and vinylic resins. Laminates of glass fibres and cloth with such plastics when properly prepared are known to possess exceptional strength in relation to their weight and can be substituted with advantage for structural material such as wood, wood products, metals and the like in a variety of applications. In certain of these applications as, for example, fishing rods, boat hulls and the like, the plastic laminate comes in contact with water, and there is a tendency for the plastic and glass fibres to de-laminate. Water tends to travel along the glass fibres breaking the bond between the glass and plastic and also reducing the physical strength of the glass fibres themselves. Hence in such cases there is a need for an effective method of rendering the glass fibres water-repellent or improving the resin-to-glass bond to such an extent that the fibres will not be wetted with water.

Glass cloth is also used in the form of a marquisette as a curtain material and when so used it is desirable that it be capable of being printed with water-resistant designs. The problem of bonding coloring materials to glass cloth in such manner that the cloth can subsequently be washed without removal of the dyes or other coloring or finishing materials has presented certain difficulties.

It is accordingly an object of the present invention to provide an improved method of making glass fibres and glass cloth water-repellent. It is another object of the invention to provide a method of treating glass fibres to apply a coating thereto that provides a bond of improved strength between the glass fibres and plastic in a laminate of the character referred to above. It is still another object of the invention to so treat the surface of glass fibres that when they are laminated with a plastic the bond between the plastic and glass fibres will be more resistant to water than is the case with laminates previously available. It is still another object of the invention to provide a method of bonding coloring or other finishing materials to glass cloth to provide a water-resistant design or finish thereon. It is a still further object of the invention to provide a method of coating glass fibres to improve the abrasion and soil resistance thereof. Other objects of the invention will be in part obvious and in part pointed out hereafter.

In our parent application Serial No. 119,569 referred to above, it is disclosed that glass surfaces can be rendered water repellent by applying to glass fibres, either in fibre form or in the form of cloth, a coating of insoluble organosilicon compounds. In accordance with the method there disclosed a stable, strongly alkaline, aqueous solution of the products of the alkaline hydrolysis of an organo trihalosilane is prepared, and the pH of this solution is then adjusted to produce a controlled deposition of a coating of organosilicon compounds on the glass surface to be treated, after which the deposited coating is cured at an elevated temperature to complete polymerization of the organosilicon compounds thereon. The aqueous alkaline solutions used as a starting material in the present method can conveniently be prepared as disclosed in the applications of Clinton W. MacMullen Serial No. 232,651, and Serial No. 232,652, both filed on January 20, 1951, both now abandoned, and MacMullen Patent 2,587,636.

In general, the solutions are prepared by causing an organotrihalosilane to react with an aqueous alkali containing say 5% to 25% by weight of alkali metal hydroxide and maintaining the concentration of alkali at a sufficiently high value to provide a stable solution of the alkaline hydrolysis products of the organotrihalosilane. The solutions of organosilicon compounds thus prepared exhibit excellent wetting properties and hence spread rapidly over the glass surfaces to be treated and rapidly penetrate a woven mass of fibres. Such aqueous solutions are more convenient for use in treating fibres and fabrics than are organic solvent solutions of organosilicon compounds that have been previously proposed.

As disclosed in the above-mentioned applications and patent, the organosilicon hydrolysis products can contain a wide variety of organo substituents, depending on the nature of the organotrihalosilane which is hydrolyzed. Thus in application Serial No. 232,651 methods are disclosed for preparing aqueous alkaline solutions of organosilicon compounds wherein the organo substituent is a methyl, ethyl, n-propyl, isopropyl, n-butyl, secondary butyl, tertiary butyl, mixed amyl, 2-ethylhexyl, n-octyl, lauryl, or octadecyl radical. In application Serial No. 232,652 methods are disclosed for preparing aqueous alkaline solutions of organosilicon compounds wherein the organo substituent is a vinyl, allyl, methallyl, butenyl or oleyl radical. In Patent No. 2,587,636 methods are disclosed for preparing aqueous alkaline solutions of organosilicon compounds wherein the organo substituent is a methylphenyl, ethylphenyl, propylphenyl, isopropylphenyl, diisopropylphenyl, butylphenyl, amylphenyl, diamylphenyl, amylnaphthyl, tetrahydro-naphthyl, benzyl, methylbenzyl, ethylbenzyl, diethylbenzyl, amylbenzyl, isopropylphenylethyl, phenyl or benzyl radical. Organosilicon solutions containing other organo substituents can be prepared by methods analogous to those specifically disclosed in these applicaitons and patents. While any of the foregoing aqueous alkaline organosilicon solutions can be used as a starting material in the present process, the character of the results obtained varies somewhat with the nature of the organo substituent as will be further described hereafter.

In our parent application Serial No. 119,569 it is disclosed that satisfactory deposition of an insoluble organosilicon compound on the glass surface can be secured by reducing the pH of the strongly alkaline, aqueous solution to a value between 1 and 13. We have now discovered that substantial advantages can be achieved by operating within a particular part of this relatively broad range, preferably between pH 2 and 6. In the commercial application of organosilicon coatings to glass fibres and cloths, it is usually desirable to employ a continuous process wherein the fibres or cloth are passed through a bath of the treating solution, and it is evident that if a bath is to be commercially satisfactory for a continuous operation of this sort the bath must retain its stability for an appreciable period of time, that is to say, the nature of the bath must be such that the organosilicon content thereof does not precipitate out immediately but remains in solution or suspension for a period of some hours. The strongly alkaline solutions produced by the processes of the MacMullen applications and patents referred to above are stable for an indefinite period of time, but such solutions are not suitable for the treatment of glass fibres because of the fact that the alkali tends to attack and weaken the fibres. Moreover, even if the alkali concentration is reduced by partially neutralizing such strongly alkaline solutions and then applying them to the glass fibres, a subsequent acidification step is necessary in order to prevent weakening of the fibres and produce a coating having satisfactory properties.

While the strongly alkaline solutions of organo-silicon compounds are stable for an indefinite period of time, the reduction of the pH of such solutions, in general, reduces their stability substantially. For example, in the range of pH 9 to 11 the solutions are so unstable that substantially all of the organosilicon content is precipitated from solution within a period of a few seconds. We have found, however, that if the strongly alkaline solutions are rapidly acidified to a pH between 2 and 6 the resulting acidified solutions have an exceptional and unexpected stability, and that if properly prepared they may remain stable for a period of days. While we do not wish to be bound by any particular theory of the present process, it is our present understanding that this improved stability is due to the formation of a sol wherein the disperse phase is composed of finely divided particles of insoluble partially polymerized organosilicon compounds. In any event, by following the teachings of the present invention a stable solution or dispersion is obtained that can be effectively used in a continuous process for treating glass fibres to deposit an organosilicon coating thereon, and since the treating solution is already acid no subsequent acidification step is required either to prevent tendering of the fibres or to complete polymerization of the organosilicon compound.

In carrying out the present method it is a matter of considerable importance that the acidification of the strongly alkaline solution be carried out very rapidly, since if the solution remains for an appreciable period at a pH between 9 and 11 substantially all of its organosilicon content will precipitate out. To effect this rapid acidification it is desirable that the strongly alkaline starting solution be added to an aqueous acid containing a sufficient amount of acid to cause the pH of the resulting mixed solution to fall between 2 and 6.

The resulting solutions have been found to be excellent treating baths for glass fibres or cloth to yield products having superior resin adhesion in laminates with plastics. It has also been found that these baths can be used to improve the wash-fastness of glass cloth that has been treated with a resin finish either with or without a dye as, for example, in the finishing of glass marquisette. Also the organosilicon solutions are sufficiently stable so that they can be combined with lubricants and other resins to produce coatings that can be applied in the fibre-forming operations and yield glass fibres with superior resin compatibility properties as evidenced by the wet strength of plastic laminates formed therewith.

While the concentration of soluble organosilicon compounds in the treating solution may be varied over a relatively wide range of say 0.1% to 4.0% by weight, the preferred range is about 0.2 to 1.0% by weight.

The treating solution can be applied to the glass cloth or fibres in any of various ways such as by spraying, dipping, padding and the like. In cases where the glass cloth or fibre is immersed in the acidified solution, an immersion time of a fraction of a second is sufficient although a longer period of immersion can be used depending upon the type of apparatus used and the material being treated. Thus in continuous finishing machines where the glass cloth is run continuously through the treating bath the time of immersion may be a small fraction of a second. On the other hand, in the batch treatment of the cloth an immersion time of a few seconds to a few minutes may be used. The coated glass is dried either at room temperature or at an elevated temperature to further insolubilize the coating. If the removal of the water soluble salts on the dried material is desired, the glass may then be washed with water and again dried at room temperature or at temperatures as high as 450° F. Such a washing step improves the properties of the resulting laminates, particularly in that it makes them less water sensitive.

In order to point out more fully the nature of the present invention, the following specific examples are given of illustrative methods of carrying out the invention:

EXAMPLE I

An aqueous alkaline solution containing about 10% by weight of sodium hydroxide was prepared by diluting 707 grams of aqueous 42% caustic soda with 2683 grams of water in a stainless steel beaker. To this caustic soda solution was added 192.5 grams of vinyl trichlorosilane in a thin stream with stirring. The mixture was stirred for one hour to produce a solution of sodium salts comprising the alkaline hydrolysis products of vinyl trichlorosilane. The resulting solution was filtered and analyzed and found to contain about 4% by weight of the sodium salts of the vinyl derivative.

The aqueous alkaline solution of the hydrolysis products as thus prepared was added to an aqueous acid in ratio of one part by weight of the alkaline solution to four parts of acid, the concentration of acid being so selected as to give the mixed bath a pH of about 4. The proper concentration of acid was determined by titrating a sample of the alkaline hydrolysis products and calculating the amount of concentrated hydrochloric acid required to acidify this solution to pH 4. This amount of concentrated acid was then diluted with water to give a sufficient volume of solution to dilute the hydrolysis products to about one-fifth of their original concentration.

The alkaline hydrolysis products prepared as described above were added to the aqueous acid. The alkaline solution was added gradually with stirring and the pH of the bath determined from time to time until a pH of 4 was reached. When a pH of 4 was reached before all of the alkaline hydrolysis products had been added, an amount of acid was added sufficient to neutralize the remaining alkaline vinyl-silicon solution to be added, whereas when the final pH was below 4 a small amount of dilute sodium hydroxide was added. As pointed out above, it has been found that it is important to add the hydrolysis products to the acid rather than the acid to the hydrolysis products in order to make sure that each portion of the aqueous alkaline solution of hydrolysis products is acidified as rapidly as possible and does not remain for any appreciable period of time in the relatively unstable pH range of 9 to 11. The acidified solution contained about 0.75% by weight of the hydrolysis products.

Heat-cleaned glass cloth was immersed in the treating bath thus prepared for about a second and then dried at a temperature of about 400° F. Thereafter the glass cloth was passed through a dip tank containing hot water and then through sprays of water to remove therefrom sodium chloride formed during the neutralizing of the treating bath. Cloth was then dried by passing it through a tower which again was maintained at 400° F.

The resulting glass cloth exhibited improved water repellency and was suitable for preparation of superior reinforced plastics using polyester resin. Laminates prepared from this cloth and polyester resins had a dry strength of 60,000 pounds per square inch and a strength in excess of 50,000 pounds per square inch after immersion in water for fourteen days. On the other hand, laminates prepared in the same manner but without the organosilicon treatment of the present process failed in dry strength tests at about 59,000 pounds per square inch and had a wet strength of only 25,000 pounds per square inch.

EXAMPLE II

An acidic emulsion was prepared by adding 556 grams of butadiene-styrene copolymer latex (45% solids) to 7000 grams of water and then adding 170 grams of concentrated hydrochloric acid (20° Baumé) slowly with agitation to the latex suspension. To this acidified emulsion 2000 grams of an alkaline solution of the hydrolysis products of amyl trichlorosilane was added slowly with agitation in such manner that the pH remained below 4.0 at all times. This was accomplished by maintaining a continual check on the pH and if it approached 4.0 more acid was added. The emulsion containing the organosilicon compounds was made up to 10,000 grams with water and the pH was adjusted to 6.0. The resultant emulsion contained 0.13% of the organosilicon hydrolysis products.

The acidified bath containing the organosilicon hydrolysis products and butadiene-styrene latex was applied to the glass fibres immediately after formation of the fibres by passing the fibres over a rubber roll wetted with the emulsion prepared in the above manner. The fibres were then gathered in a strand, packaged and dried at about 150° F. for eighteen hours.

The glass stands treated in the above manner were used to reinforce polyester resins and exhibited superior glass-to-resin adhesion as indicated by the fact that they retained better than 80% of their flexural strength after boiling in water for two hours. By comparison, reinforced polyester laminates prepared from glass fibres not treated with the above forming size retained less than 60% of their flexural strength after boiling under the same conditions.

EXAMPLE III

An acidic emulsion was prepared by adding 500 grams of polyvinyl acetate emulsion (42% solids) to 7,000 grams of water and then adding to this emulsion 160 grams of concentrated hydrochloric acid (20% Baumé) slowly, with agitation. To this acidic emulsion, 2,000 grams of an alkaline solution of the hydrolysis products of allyl trichlorosilane was added very slowly in such manner that the pH was kept below 4.0. The resultant mixture was made up to a total of 10,000 grams with water and the pH adjusted to 6.0. The forming size thus produced contained about 0.2% by weight of the allyl silicon compounds.

The forming size so prepared was applied to glass fibres immediately after they had been formed by passing the fibres over a rubber roll covered with the acidified emulsion. The strands so treated were dried at 150° F. for eighteen hours, and were then made into a roving and used to reinforce polyester resin.

Plastic reinforced with the glass fibres that had been coated with the forming size containing the allyl hydrolysis products exhibited superior resin adhesion as evidenced by a flexural strength retention of better than 90% after boiling in water for a period of two hours. In contrast, polyester resin reinforced with fibres treated in the same manner but without any organosilicon treatment retained less than 60% of their dry flexural strength when boiled in water for two hours.

EXAMPLE IV

An aqueous acid solution was prepared by adding two gallons of concentrated hydrochloric acid (20° Baumé) to 38 gallons of water. Ten gallons of an alkaline solution of the hydrolysis products of amyl trichlorosilane was added to the acidified water slowly with agitation. The resultant solution had a pH of around 3.0 and contained about 0.3% of the amyl derivatives of the hydrolysis products.

Glass cloth which had been heat-cleaned, weave-set, and finished with a mixed Hycar-Teflon emulsion containing a yellow pigment dye and cured at 350° F. was dipped into the acidic organosilicon bath, passed through a set of squeeze rolls to remove the excess, and again dried at 350° F.

The resultant cloth, which had an ignition loss of 1.9%, could be washed without loss of either color or resin and was water-repellent. Cloth which had been finished with the Hycar-Teflon emulsion containing dye but which had not been dipped in the acidic organosilicon bath lost all of its color and resin after being washed in the same manner. It was also found that the acidified organo-silicon bath imparted superior soil-resistance to the glass marquisette cloth.

EXAMPLE V

An acidic emulsion was prepared by adding 556 grams of butadiene-styrene latex (45% solids) to 7,000 grams of water and then adding to this mixture slowly with agitation 170 grams of concentrated hydrochloric acid (20° Baumé). To this acidic emulsion 2,000 grams of an alkaline solution of the hydrolysis products of vinyl trichlorosilane was added slowly with agitation in such a manner that the pH remained below 4.0 at all times. This was accomplished by maintaining a continual check on the pH and adding more acid if the pH rose to 4.0. The emulsion contaning the vinyl derivative of the hydrolysis products was made up to 10,000 grams with water and the pH adjusted to 6.0. The resultant emulsion contained 0.2% by weight of the vinyl silicon compounds.

The acidified emulsion prepared in the above manner was applied to the glass fibres immediately after forming by passing the glass fibres over a rubber roll wetted with the emulsion. The fibres were then gathered into a strand, packaged on a tube, and dried at about 150° F. for eighteen hours.

The glass strand treated in the above manner was formed into a roving by combining it with others of like character and used to reinforce polyester resin. Superior glass to resin adhesion was indicated by the fact that the reinforced resin so prepared retained better than 90% of its dry flexural strength after boiling for two hours or immersion in water for fourteen days. Reinforced polyesters prepared from glass fibres made in the usual manner without organosilicon treatment retained less than 60% of their dry flexural strength.

It is of course to be understood that the foregoing examples are illustrative only and that numerous changes may be made therein without departing from the spirit of the invention. Thus as previously indicated the time of immersion in the treating bath may vary from a fraction of a second to several minutes depending upon the type of machinery used. While pH of the treating solution is preferably maintained between 2 and 6, there are certain instances where persistent stability is not essential and in such cases acidic solutions having a pH outside the preferred range can be used satisfactorily. The drying and curing steps may also be carried out in any of a variety of ways such as by passing the cloth through a vertical forced-air drying tower or over steam-heated drums. The curing temperature and time are interrelated and in general higher temperatures will be used with shorter curing periods and vice versa.

After the organosilicon coating has been applied and ried, it is usually desirable to wash the cloth to remove oluble salts therefrom. Washing may be effected in any f various washers commonly used in the textile industry. The cloth is preferably washed sufficiently to reduce the alt content to less than 0.10% by weight before it is sed for laminating purposes.

As indicated previously, the nature of the results obained varies to some extent with the character of the rgano constituent in the organosilicon compound. For xample, it has been found that superior resin adhesion s obtained in general when using hydrolysis products ormed from alkenyl trichlorosilanes. When using the lkyl derivatives less favorable results have been obtained vith the first few members of the series than with those ontaining 4 to 12 carbon atoms. Thus when alkyl contituents containing 4 to 12 carbon atoms are used better vater-proofing is secured and also improved adherence o glass surfaces. For example, the adherence of the myl derivatives to glass surfaces is materially better than he adherence of the methyl derivatives to such surfaces.

From the foregoing description it should be apparent hat the present invention provides a method of achieving he several objects set forth at the beginning of the presnt specification. By using the acidic solutions of the resent invention the possibility of tendering of the glass ibres due to the presence of alkali is avoided. Moreover, the coating deposited from the acid solution is more ompletely polymerized than that deposited from the lkaline solution. Also when alkaline solutions are used separate acidification step is required after application f the treating solution to the fibres, whereas with the resent process, especially where a volatile acid such as ydrochloric acid is used, this extra step is eliminated.

In the following claims the term glass fibres is intended o comprehend both fibres as such and fibres in the form f cloth.

We claim:

1. The method of treating a glass surface to produce coating of insoluble organosilicon compounds thereon vhich comprises preparing an aqueous alkaline solution f the hydrolysis products of a [hydrocarbon substituted] *inyl* trihalosilane, rapidly reducing the pH of said soluion to a value between 2 and 6 to produce a stable acidic olution of said hydrolysis products, applying said acidic olution to said glass surface to cause a coating of inoluble organosilicon compounds to be deposited on said urface, and curing said coating at an elevated temperaure below the softening point of said glass to complete olymerization of said compounds.

2. The method of treating a glass surface to produce a oating of insoluble organosilicon compounds thereon vhich comprises preparing an aqueous alkaline solution f the hydrolysis products of a [hydrocarbon substituted] *inyl* trihalosilane, reducing the pH of said solution to value between 2 and 6 to form a stable acidic solution f said hydrolysis products, applying the acidified soluion to said glass surface to cause a coating of insoluble rganosilicon compounds to be deposited on said surface, nd curing said coating at an elevated temperature below he softening point of said glass to complete polymerizaion of said compounds.

3. The method of treating glass fibres to form a coatng of insoluble organosilicon compounds thereon which omprises treating with an aqueous alkali metal hydroxide [hydrocarbon substituted] *vinyl* trihalosilane to form n aqueous alkaline solution of the hydrolysis products f said trihalosilane, rapidly reducing the pH of said solution to produce a stable acidic solution of said hydrolysis products, applying said acidic solution to said glass fibres to cause a coating of insoluble organosilicon compounds to be deposited on said fibres, and curing said fibres at an elevated temperature below the softening point of said fibres to complete polymerization of said compounds.

4. The method of treating glass fibres to produce an insoluble coating of organosilicon compounds thereon which comprises preparing an aqueous alkaline solution of the hydrolysis products of a [hydrocarbon-substituted] *vinyl* trihalosilane, reducing the pH of said solution to a value between 2 and 6 to form a stable acidic solution of said hydrolysis products, applying the acidified solution to said glass fibres to cause an insoluble coating of organosilicon compounds to be deposited on said fibres, and curing said coating at an elevated temperature below the softening point of said fibres to complete polymerization of said compound.

5. The method of treating glass fibres to produce a coating of insoluble organosilicon compounds thereon which comprises preparing an aqueous alkaline solution of the hydrolysis products of a [hydrocarbon-substituted] *vinyl* trichlorosilane, adding said hydrolysis products to an aqueous acid to produce a solution having a pH of 2 to 6, immersing said fibres in the resulting acid solution to cause a coating of insoluble organosilicon compounds to be deposited on the fibres, and curing said coating at an elevated temperature below the softening temperature of said fibres to complete polymerization of said compounds.

6. A method according to claim 5 and wherein the aqueous solution of hydrolysis products is acidified to a pH of about 4 before being applied to the glass fibres.

[7. A method according to claim 5 and wherein the hydrocarbon substituent is a vinyl radical.]

[8. A method according to claim 5 and wherein the hydrocarbon substituent is an allyl radical.]

[9. A method according to claim 5 and wherein the hydrocarbon substituent is an amyl radical.]

10. A composition for treating materials to render them water-repellent, said composition being a stable aqueous sol of [hydrocarbon substituted] *vinyl* silane triol having a pH of from 2–6.

11. A composition for treating materials to render them water-repellent, said composition being a stable aqueous sol of [hydrocarbon substituted] *vinyl* silane triol having a pH of about 4 and containing from [1%] *0.1%* to 4% by weight of said silane triol.

References Cited in the file of this patent or the original patent

UNITED STATES PATENTS

| | | |
|---|---|---|
| 2,306,222 | Patnode | Dec. 22, 1942 |
| 2,375,998 | McGregor et al. | May 15, 1945 |
| 2,439,689 | Hyde | Apr. 13, 1948 |
| 2,507,200 | Elliott | May 9, 1950 |
| 2,531,571 | Hyde | Nov. 28, 1950 |
| 2,563,288 | Steinman | Aug. 7, 1951 |
| 2,568,384 | Cheronis | Sept. 18, 1951 |
| 2,587,636 | MacMullen | Mar. 4, 1952 |
| 2,646,373 | MacMullen | July 21, 1953 |
| 2,680,073 | Davidson et al. | June 11, 1954 |
| 2,688,006 | Steinman | Aug. 31, 1954 |
| 2,763,629 | Gottfurcht | Sept. 18, 1956 |

OTHER REFERENCES

Rochow: Chemistry of the Silicones, 1946, pp. 35 to 38.